(12) United States Patent
Geibel et al.

(10) Patent No.: US 9,104,491 B2
(45) Date of Patent: Aug. 11, 2015

(54) BATCH SCHEDULER MANAGEMENT OF SPECULATIVE AND NON-SPECULATIVE TASKS BASED ON CONDITIONS OF TASKS AND COMPUTE RESOURCES

(75) Inventors: Jonathan Eric Geibel, Burbank, CA (US); Jeffrey M. Jordan, Valley Village, CA (US); Scott Lane Burris, Palmdale, CA (US); Kevin Christopher Constantine, Sherman Oaks, CA (US); Henry Allen Driskill, Valencia, CA (US)

(73) Assignee: Disney Enterprises, Inc., Burbank, CA (US)

( * ) Notice: Subject to any disclaimer, the term of this patent is extended or adjusted under 35 U.S.C. 154(b) by 699 days.

(21) Appl. No.: 13/401,773

(22) Filed: Feb. 21, 2012

(65) Prior Publication Data
US 2013/0219395 A1 Aug. 22, 2013

(51) Int. Cl.
*G06F 9/455* (2006.01)
*G06F 9/50* (2006.01)

(52) U.S. Cl.
CPC ........ *G06F 9/5072* (2013.01); *G06F 2209/504* (2013.01); *Y02B 60/142* (2013.01)

(58) Field of Classification Search
None
See application file for complete search history.

(56) References Cited

U.S. PATENT DOCUMENTS

| | | | | |
|---|---|---|---|---|
| 7,725,583 | B2 * | 5/2010 | Jackson | 709/226 |
| 8,417,499 | B2 * | 4/2013 | Chen et al. | 703/13 |
| 8,782,240 | B2 * | 7/2014 | Free et al. | 709/226 |
| 2004/0243771 | A1 * | 12/2004 | Oldfield et al. | 711/151 |
| 2007/0022423 | A1 * | 1/2007 | Bril et al. | 718/102 |
| 2007/0083868 | A1 * | 4/2007 | Sankaranarayan et al. | 718/104 |
| 2007/0220516 | A1 * | 9/2007 | Ishiguro et al. | 718/101 |
| 2011/0093596 | A1 * | 4/2011 | Zimmet et al. | 709/226 |
| 2011/0231853 | A1 * | 9/2011 | Murray et al. | 718/103 |
| 2011/0276978 | A1 * | 11/2011 | Gaiarsa et al. | 718/104 |
| 2012/0144039 | A1 * | 6/2012 | Watson et al. | 709/226 |
| 2013/0174172 | A1 * | 7/2013 | Naga et al. | 718/103 |

* cited by examiner

*Primary Examiner* — Tammy Lee
(74) *Attorney, Agent, or Firm* — Patent Ingenuity, P.C.; Samuel K. Simpson (57) ABSTRACT

A request from a client to perform a task is received. The client has a predetermined limit of compute resources. The task is dispatched from a batch scheduler to a compute node as a non-speculative task if a quantity of compute resources is available at the compute node to process the task, and the quantity of compute resources in addition to a total quantity of compute resources being utilized by the client is less than or equal to the predetermined limit, such that the non-speculative task is processed without being preempted by an additional task requested by an additional client. The task is dispatched, from the batch scheduler to the compute node, as a speculative task if the quantity of compute resources is available to process the task, and the quantity of compute resources in addition to the total quantity of compute resources is greater than the predetermined limit.

28 Claims, 5 Drawing Sheets

BATCH SCHEDULER MANAGEMENT OF SPECULATIVE AND NON-SPECULATIVE TASKS BASED ON CONDITIONS OF TASKS AND COMPUTE RESOURCES

BACKGROUND

1. Field

This disclosure generally relates to the field of computer systems. More particularly, the disclosure relates to batch scheduling.

2. General Background

Many current computer systems utilize batch scheduling to execute a series of programs without manual intervention. Batch scheduling allows large sets of data to be processed in batches. A compute node may run the batches of tasks. The compute node may be a computing device, a program executed on a computing device, an operating system, or the like. Further, a computing device, e.g., a server, may have one or more compute nodes. Current approaches to batch scheduling do not adequately provide for sharing of the compute resources by a group of users. As a result, some users may be able to utilize more compute resources than other users, which may lead to those other users not being able to utilize the compute resources they need when they need them.

SUMMARY

In one aspect of the disclosure, a computer program product is provided. The computer program product includes a computer readable medium having a computer readable program stored thereon. The computer readable program when executed on a computer causes the computer to receive, from a client, a request to perform a task. The client has a predetermined limit of compute resources. Further, the computer readable program when executed on the computer causes the computer to dispatch the task, from a batch scheduler to a compute node, as a non-speculative task if a quantity of compute resources is available at the compute node to process the task and the quantity of compute resources in addition to a total quantity of compute resources being utilized by the client is less than or equal to the predetermined limit such that the non-speculative task is processed without being preempted by an additional task requested by an additional client. In addition, the computer readable program when executed on the computer causes the computer to dispatch the task, from the batch scheduler to the compute node, as a speculative task if the quantity of compute resources is available to process the task and the quantity of compute resources in addition to the total quantity of compute resources is greater than the predetermined limit.

In another aspect of the disclosure, a process is provided. The process receives, from a client, a request to perform a task. The client has a predetermined limit of compute resources. Further, the process dispatches the task with a processor, from a batch scheduler to a compute node, as a non-speculative task if a quantity of compute resources is available at the compute node to process the task and the quantity of compute resources in addition to a total quantity of compute resources being utilized by the client is less than or equal to the predetermined limit such that the non-speculative task is processed without being preempted by an additional task requested by an additional client. In addition, the process dispatches the task with the processor, from the batch scheduler to the compute node, as a speculative task if the quantity of compute resources is available to process the task and the quantity of compute resources in addition to the total quantity of compute resources is greater than the predetermined limit.

In yet another aspect of the disclosure, a system is provided. The system includes a batch scheduler that receives a request to perform a task from a client having a predetermined limit of compute resources, dispatches the task to a compute node as a non-speculative task if a quantity of compute resources is available at the compute node to process the task and the quantity of compute resources in addition to a total quantity of compute resources being utilized by the client is less than or equal to the predetermined limit such that the non-speculative task is processed without being preempted by an additional task requested by an additional client, and dispatches the task to the compute node as a speculative task if the quantity of compute resources is available to process the task and the quantity of compute resources in addition to the total quantity of compute resources is greater than the predetermined limit.

In another aspect of the disclosure, a computer program product is provided. The computer program product includes a computer readable medium having a computer readable program stored thereon. The computer readable program when executed on a computer causes the computer to receive a task and a type of the task from a batch scheduler at a compute node. The task is requested by a client having a predetermined limit of compute resources. Further, the computer readable program when executed on the computer causes the computer to execute the task, at the compute node, as a non-speculative task if the type is non-speculative. The task is non-speculative if a quantity of compute resources is available at the compute node to process the task and the quantity of compute resources in addition to a total quantity of compute resources being utilized by the client is less than or equal to the predetermined limit such that the non-speculative task is processed without being preempted by an additional task requested by an additional client. In addition, the computer readable program when executed on the computer causes the computer to execute the task, at the compute node, as a speculative task if the type is speculative. The task is speculative if the quantity of compute resources is available to process the task and the quantity of compute resources in addition to the total quantity of compute resources is greater than the predetermined limit.

In yet another aspect of the disclosure, a process is provided. The process receives a task and a type of the task from a batch scheduler at a compute node. The task is requested by a client having a predetermined limit of compute resources. Further, the process executes the task, at the compute node, as a non-speculative task if the type is non-speculative. The task is non-speculative if a quantity of compute resources is available at the compute node to process the task and the quantity of compute resources in addition to a total quantity of compute resources being utilized by the client is less than or equal to the predetermined limit such that the non-speculative task is processed without being preempted by an additional task requested by an additional client. In addition, the process executes the task, at the compute node, as a speculative task if the type is speculative. The task is speculative if the quantity of compute resources is available to process the task and the quantity of compute resources in addition to the total quantity of compute resources is greater than the predetermined limit.

In another aspect of the disclosure, a system is provided. The system includes a processor that receives a task and a type of the task from a batch scheduler at a compute node, executes the task, at the compute node, as a non-speculative task if the type is non-speculative, and executes the task, at the compute node, as a speculative task if the type is speculative. The task is speculative if the quantity of compute resources is available to process the task and the quantity of compute resources in addition to the total quantity of compute resources is greater than the predetermined limit. The task is requested by a client having a predetermined limit of compute resources. The task is non-speculative if a quantity of compute resources is available at the compute node to process the task and the quantity of compute resources in addition to a total quantity of compute resources being utilized by the client is less than or equal to the predetermined limit such that the non-speculative task is processed without being preempted by an additional task requested by an additional client.

BRIEF DESCRIPTION OF THE DRAWINGS

The above-mentioned features of the present disclosure will become more apparent with reference to the following description taken in conjunction with the accompanying drawings wherein like reference numerals denote like elements and in which.

DETAILED DESCRIPTION

A batch scheduler may be configured according to a set of compute resource allocation criteria. The set of compute resource allocation criteria indicates a predetermined limit on a quantity of compute resources that may be allocated to each user. For example, the set of compute resource allocation criteria may indicate that each user may only utilize five percent of the memory of a compute node at any given instance. In other words, the set of compute resource allocation criteria helps ensure that each user is provided with a fair share of compute resources. For example, the set of compute resource allocation criteria helps avoid a situation where a user utilizes eighty percent of the memory and only leaves twenty percent of the memory to the remaining users that in total need far more than twenty percent of the memory. However, a user may be allowed to exceed his or her predetermined limit if compute resources are available.

The tasks that the user runs within his or her predetermined limit are referred to herein as non-speculative tasks. Further, the tasks that the user runs that exceed his or her predetermined limit if compute resources are available are referred to herein as speculative tasks. A speculative task may be further classified as to the number of predetermined limits it is simultaneously exceeding. This is called the speculative magnitude. For example, if a task exceeds 3 predetermined limits, its speculative magnitude would be 3. Speculative tasks can pre-empt other speculative tasks with a higher speculative magnitude. For example, if a task has a speculative magnitude of 1, the queueing system may pre-empt any number of speculative tasks with speculative magnitudes of 2 or greater in order to run the task of speculative magnitude 1.

In one aspect, although a user may exceed his or her predetermined limit to run a task, that task is speculative and may be preempted by other tasks that are higher priority at any given time. For example, a user may have a predetermined limit of five percent of compute resources. The user may run non-speculative tasks that utilize five percent of the compute resources and speculative tasks that utilize an additional ten percent of the compute resources if the additional ten percent of the compute resources are available. However, other users may wish to utilize their predetermined limits of non-speculative tasks after the initial user begins utilizing the additional ten percent of the compute resources. If that additional ten percent of the compute resources has to be utilized to meet the predetermined limits of the non-speculative tasks of the other users, then all or part of the additional ten percent of the compute resources has to be relinquished by the initial user. As a result, compute resources may be kept busy if there are any available tasks to run regardless of whether or not users have reached their limits. Further, compute resources of users or groups that exceed their limits may be instantly pulled back as soon as other work is ready to be run.

The batch scheduler, compute nodes, and other elements described herein may be used to generate or modify an image or a sequence of images for an animation. For example, the elements described herein may be used for modeling objects (shaping geometry), layout, rigging, look development, stereoscopic creation and manipulation (depth perception), animation (movement, computational dynamics), lighting, rendering, and/or color correction.

Figure 1:
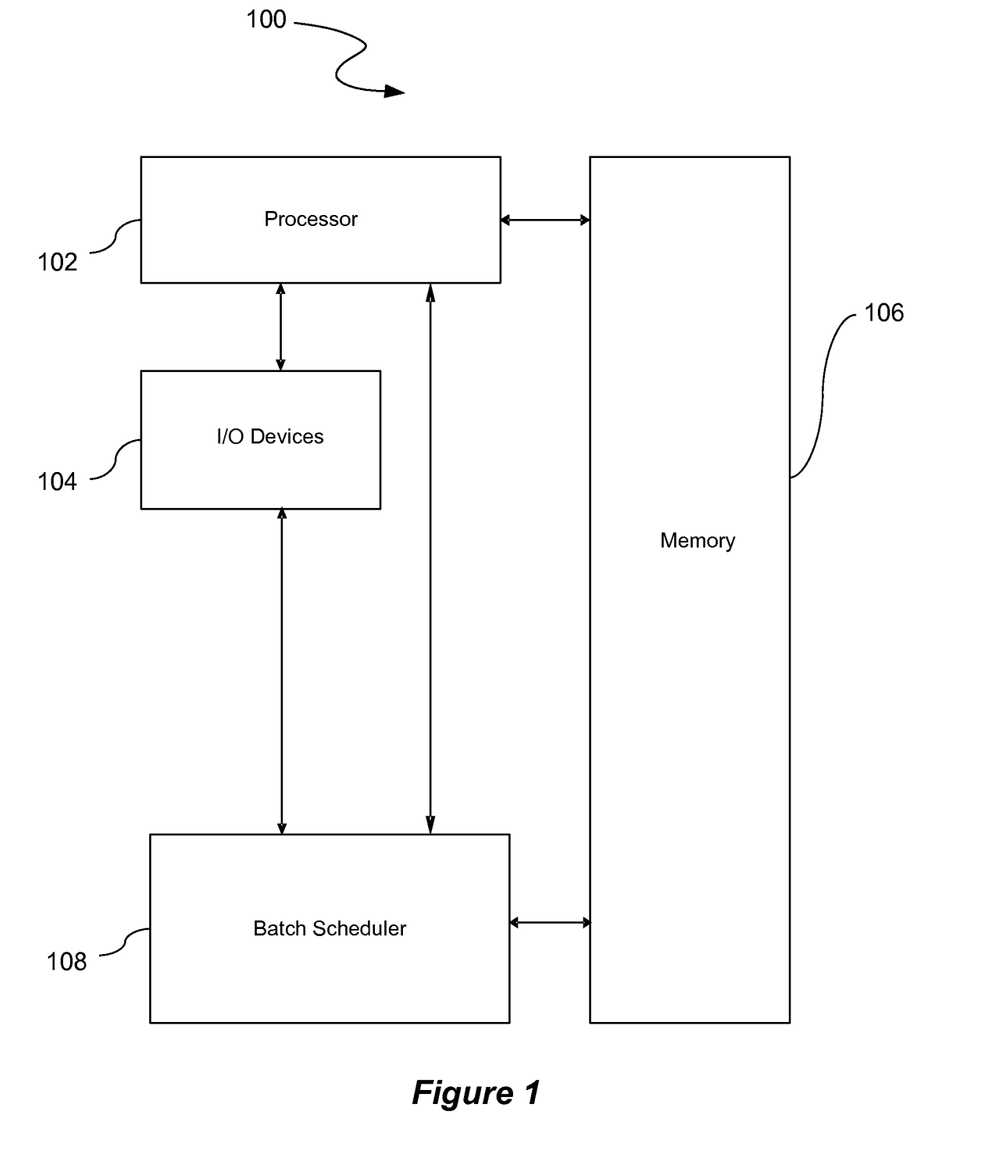
FIG. 1 illustrates a system that may be utilized to perform batch scheduling.

FIG. 1 illustrates a system 100 that may be utilized to perform batch scheduling. In one aspect, the system 100 is implemented utilizing a general purpose computer or any other hardware equivalents. Thus, the system 100 comprises a processor 102, a memory 106, e.g., random access memory ("RAM") and/or read only memory (ROM), a batch scheduler 108 that performs batch scheduling, and various input/output devices 104, (e.g., audio/video outputs and audio/video inputs, storage devices, including but not limited to, a tape drive, a floppy drive, a hard disk drive or a compact disk drive, a receiver, a transmitter, a speaker, a display, an image capturing sensor, e.g., those used in a digital still camera or digital video camera, a clock, an output port, a user input device (such as a keyboard, a keypad, a mouse, and the like, or a microphone for capturing speech commands)). In one aspect, the batch scheduler 108 is implemented as a module. Various other configurations for the batch scheduler 108 may be utilized.

It should be understood that the batch scheduler 108 may be implemented as one or more physical devices that are coupled to the processor 102. For example, the batch scheduler 108 may include a plurality of modules. Alternatively, the batch scheduler 108 may be represented by one or more software applications (or even a combination of software and hardware, e.g., using application specific integrated circuits (ASIC)), where the software is loaded from a storage medium, (e.g., a magnetic or optical drive, diskette, or non-volatile memory) and operated by the processor 102 in the memory 106 of the system 100. As such, the batch scheduler 108 (including associated data structures) of the present disclosure may be stored on a computer readable medium, e.g., RAM memory, magnetic or optical drive or diskette and the like.

The system 100 may be utilized to implement any of the configurations herein. In another aspect, the processor 102 is the batch scheduler 108. Accordingly, in such an aspect, a batch scheduler 108 that is separate from the processor 102 is unnecessary. FIG. 1 provides an example of an implementation of a batch scheduling system. However, the batch scheduling system is not limited to any particular model and may be implemented with similar and/or different components from this example.

Figure 2:
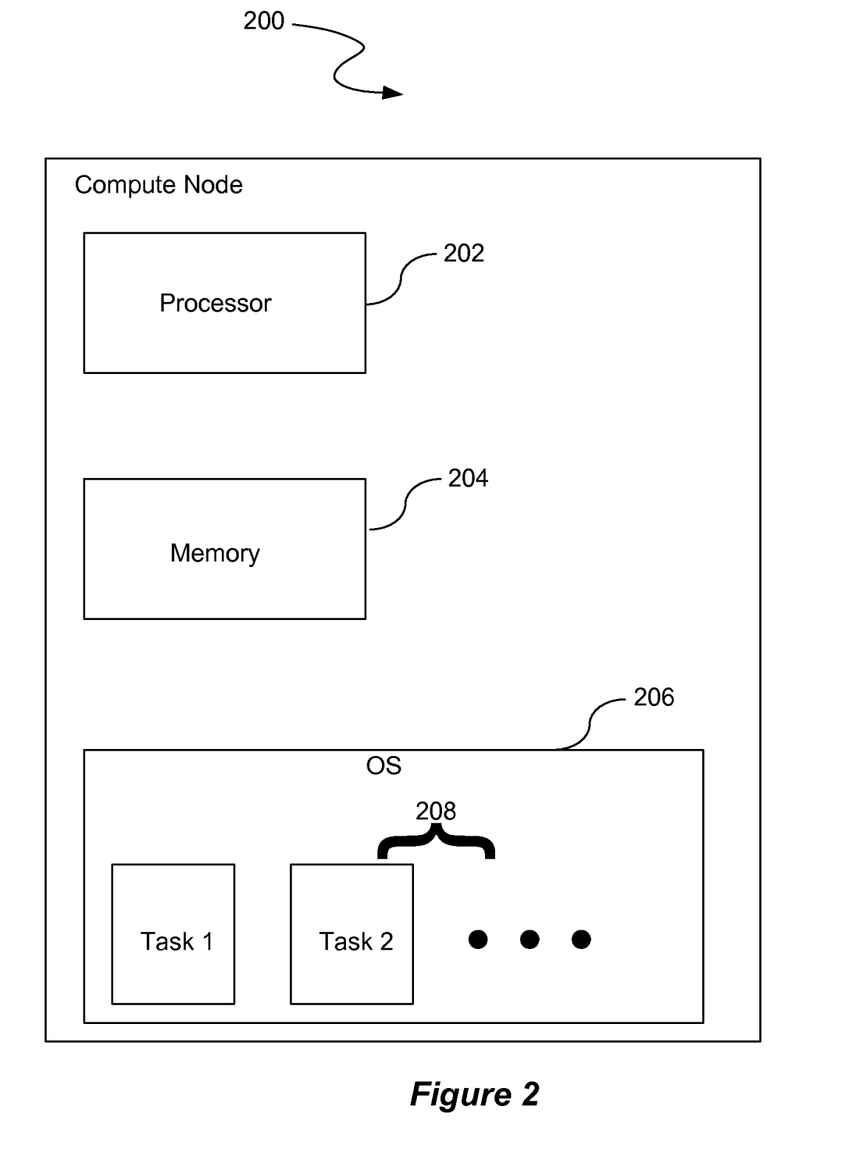
FIG. 2 illustrates an example of a compute node.

The batch scheduler 108 of the system 100 illustrated in FIG. 1 may schedule tasks on various compute nodes depending on the availability of compute resources. FIG. 2 illustrates an example of a compute node 200. The compute node may have a processor 202, a memory 204, and an operating system 206. The operating system 206 may be responsible for managing a plurality of tasks 208. Some of the plurality of tasks 208 may be utilized by a first user while other of the plurality of tasks 208 may be utilized by a second user. For example, the compute node 200 may be a server. Accordingly, users at various client devices may request that the compute node 200 process certain tasks. The processor 202 and the memory 204 are illustrated only as examples of compute resources. The compute node 200 may have various other compute resources.

Figure 3:
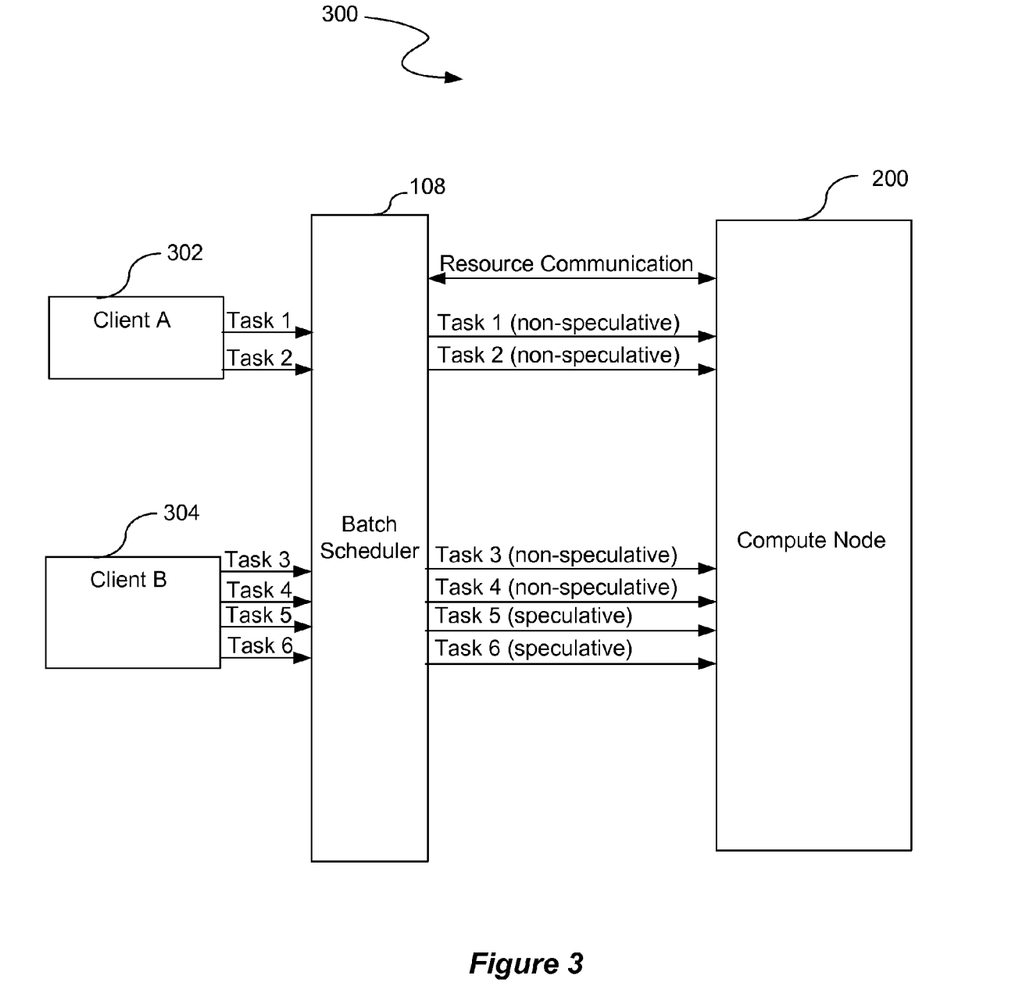
FIG. 3 illustrates a batch scheduling configuration.

FIG. 3 illustrates a batch scheduling configuration 300. The batch scheduling configuration 300 receives requests for processing tasks from various clients. An example of a client is a computing device. The batch scheduler 108 determines if compute resources are available to process the requested tasks. For example, the batch scheduler 108 may determine that the compute node 200 has available compute resources. The batch scheduler 108 may have bidirectional resource communication with the compute node 200 and/or other compute nodes to make such a determination. The determination of available compute resources involves determining what compute resources are needed by the client and what portion or percentage of those compute resources are needed by the client. For example, a client device may need five percent of the processing power of the processor 202 and twenty percent of the memory 204 illustrated in FIG. 2 to run a task.

After the batch scheduler 108 determines the needed compute resources to run tasks requested by a client and availability of those compute resources, the batch scheduler 108 may dispatch the tasks to the compute node 200. If the amount of compute resources requested for processing the tasks is less than or equal to the predetermined limit for a user or client, the batch scheduler 108 labels the tasks as non-speculative and dispatches those non-speculative tasks to the compute node 200 for processing. If the amount of compute resources requested for processing the tasks is greater than the predetermined limit for a user or client, the batch scheduler 108 labels the tasks that utilize compute resources up to the predetermined limit as non-speculative and labels the tasks that utilize compute resources over the predetermined limit as speculative.

The batch scheduler 108 dispatches the non-speculative tasks to the compute node 200 for processing. Further, the batch scheduler 108 determines if compute resources are available for processing the non-speculative tasks. If compute resources are unavailable for processing the speculative tasks, then the batch scheduler 108 does not dispatch the speculative tasks until compute resources become available. If compute resources are available for processing of the speculative tasks, the batch scheduler 108 dispatches the speculative tasks to the compute node 200.

However, if higher priority tasks require those compute resources, the batch scheduler 108 may subsequently halt the speculative tasks so that the higher priority tasks may utilize those compute resources. For example, the higher priority tasks may be non-speculative tasks of another user or client. In other words, if a user or client that is requesting compute resources within a first predetermined limit requests compute resources that are being utilized by a user or client that has exceeded a second predetermined limit, the batch scheduler 108 preempts the user or client that exceeded the second predetermined limit so that the user or client that is requesting compute resources within the first predetermined limit is able to obtain such resources.

As an example, a client A 302 may request that a first task and a second task be processed. The batch scheduler 108 may determine that the predetermined limit for the user at the client A 302 has a predetermined limit of five percent of computing resources. Further, the batch scheduler 108 may determine that processing both the first task and the second tasks would involve a total of four percent of compute resources. As the processing of the first task and the second task would involve less than the predetermined limit for the user at the client A 302, the batch scheduler 108 labels both the first task and the second task as non-speculative. Further, the batch scheduler 108 dispatches both the first task and the second task to the compute node 200 to be processed.

As another example, a client B 304 may request that a third task, a fourth task, a fifth task, and a sixth task be processed. The batch scheduler 108 may determine that the predetermined limit for the user at the client B 304 has a predetermined limit of five percent of computing resources. Further, the batch scheduler 108 may determine that processing the third task would involve two percent of compute resources, the fourth task would involve three percent of compute resources, the fifth task would involve four percent of compute resources, and the sixth task would involve five percent of compute resources. As the request for all of the tasks equals fourteen percent, which exceeds the predetermined limit of five percent, the batch scheduler 108 does not label all of the tasks as non-speculative. The batch scheduler 108 labels the third task and the fourth task as non-speculative as these requested tasks involve compute resources that equal the predetermined limit of the user at the client B 304. However, the batch scheduler 108 labels the fifth task and the sixth task as speculative as the processing of these tasks in addition to the third task and the fourth task would lead to the user at the client B 304 exceeding his or her predetermined limit.

Further, the batch scheduler 108 dispatches both the third task and the fourth task to the compute node 200 to be processed. If compute resources are available, the batch scheduler 108 dispatches the fifth task and the sixth task to the compute node 200 to be processed as speculative tasks. Accordingly, the processing of the third task and the fourth task by the compute node 200 may not be halted by the batch scheduler 108 if other requests for tasks are received. However, the processing of the fifth task and the sixth task by the compute node 200 may be halted by the batch scheduler 108 if other requests for tasks that are a higher priority are received.

The determination by the batch scheduler 108 of available compute resources is illustrated in FIG. 3 with respect to the compute node 200. However, the batch scheduler 108 may try to find available compute resources on a plurality of compute nodes. For example, the compute node 200 may only have available compute resources to process the first task, but an additional compute node may have available compute resources to process the second task. Accordingly, the batch scheduler 108 may determine a total amount of compute resources available on either a single compute node or across a plurality of compute nodes.

In one aspect, if a plurality of tasks for a particular client or user exceeds the predetermined limit, the batch scheduler 108 selects the tasks in the order that requests for the tasks were received to determine which tasks fall below or equal to the predetermined limit to be processed non-speculatively and which tasks exceed the predetermined limit to be processed speculatively. For example, the batch scheduler 108 may select the third task and the fourth task as the tasks that are non-speculative tasks. In another aspect, the batch scheduler 108 selects the tasks with the smallest amount of compute resources needed to process as many non-speculative tasks as quickly as possible. In yet another aspect, the batch scheduler 108 selects the tasks with the largest amount of compute resources needed to process the most resource intensive tasks non-speculatively. Various other ordering configurations may be utilized.

Figure 4:
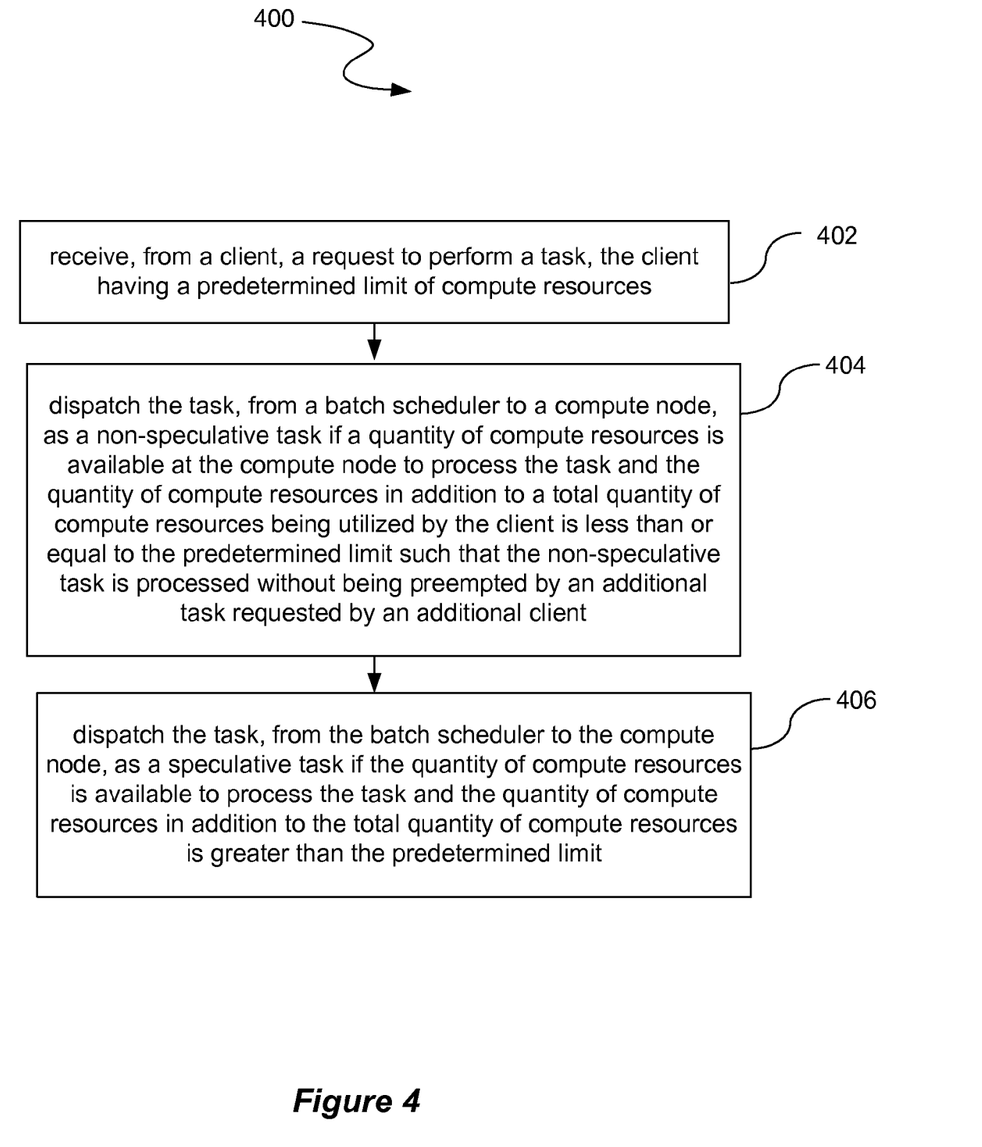
FIG. 4 illustrates a process that is utilized to provide batch scheduler management.

FIG. 4 illustrates a process 400 that is utilized to provide batch scheduler management. At a process block 402, the process 400 receives, from a client, a request to perform a task. The client has a predetermined limit of compute resources. Further, at a process block 404, the process 400 dispatches the task with a processor, from a batch scheduler to a compute node, as a non-speculative task if a quantity of compute resources is available at the compute node to process the task, and the quantity of compute resources in addition to a total quantity of compute resources being utilized by the client is less than or equal to the predetermined limit, such that the non-speculative task is processed without being preempted by an additional task requested by an additional client. In addition, at a process block 406, the process 400 dispatches the task with the processor, from the batch scheduler to the compute node, as a speculative task if the quantity of compute resources is available to process the task, and the quantity of compute resources in addition to the total quantity of compute resources is greater than the predetermined limit.

In another aspect, the process 400 may preempt the speculative task if the additional task requested by the additional client is non-speculative, and an additional quantity of compute resources is unavailable to process the additional task. In yet another aspect, the task may be promoted from the speculative task to the non-speculative task based upon completion of an additional task requested by the client and the quantity of compute resources being utilized by the client being less than or equal to the predetermined limit. In other words, speculative tasks may be promoted to non-speculative tasks if the client or user drops below or to the corresponding predetermined limit.

Figure 5:
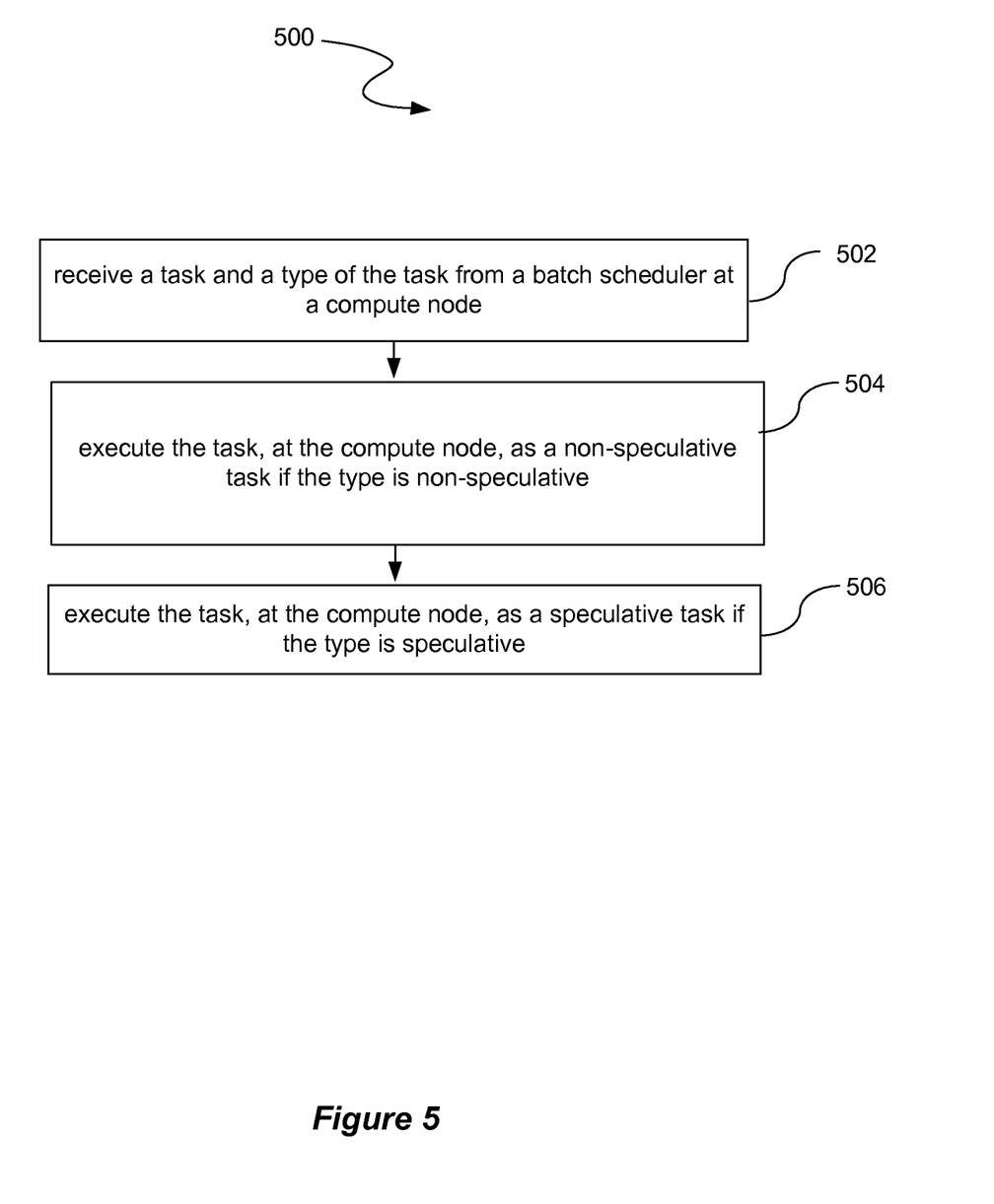
FIG. 5 illustrates a process that is utilized to provide compute node processing of a task.

FIG. 5 illustrates a process 500 that is utilized to provide compute node processing of a task. At a process block 502, the process 500 receives a task and a type of the task from a batch scheduler at a compute node. The task is requested by a client having a predetermined limit of compute resources. Further, at a process block 504, the process 500 executes the task, at the compute node, as a non-speculative task if the type is non-speculative. The task is non-speculative if a quantity of compute resources is available at the compute node to process the task, and the quantity of compute resources in addition to a total quantity of compute resources being utilized by the client is less than or equal to the predetermined limit, such that the non-speculative task is processed without being preempted by an additional task requested by an additional client. In addition, at a process block 506, the process 500 executes the task, at the compute node, as a speculative task if the type is speculative. The task is speculative if the quantity of compute resources is available to process the task, and the quantity of compute resources in addition to the total quantity of compute resources is greater than the predetermined limit.

The non-speculative and speculative aspects provided for herein may also be utilized with a variety of other configurations. For example, a host compute node may have special hardware resources, e.g., a local graphics processing unit ("GPU"), that prefers certain tasks that require those special hardware resources be run on the host compute node. Tasks that do not require these resources may still run on such a host compute node. However, such tasks may be run speculatively. When tasks need to run that require the special hardware, the speculative tasks may be preempted to make those resources available.

As another example, host compute nodes that are set aside for special functions, e.g., a high memory task or a multi-threaded job, may be utilized for work that does not require those resources by running all tasks speculatively. In the event that a task needs to run that requires those special functions, the speculative tasks will be preempted.

As yet another example, a user or a client may choose to opt-out of speculative execution on a per task basis. For example, if a task is not restartable, the user or the client may not want to run the task speculatively because speculative execution may result in work performed by the task being lost if a non-speculative task needs the compute resources utilized by the speculative task. Accordingly, the user or client may choose to wait until the task may be run non-speculatively.

As another example, if a speculatively executed task is running inside a virtual machine (VM), i.e., a software implementation of a computing device that executes programs like a physical computing device, but in a virtual manner, the batch scheduler 108 may choose to instruct the VM to release the compute resources instead of discarding the task. As a result, the current state of the task would be preserved and wasted execution time encountered with discarding and restarting speculative tasks may be prevented.

The processes described herein may be implemented in a general, multi-purpose or single purpose processor. Such a processor will execute instructions, either at the assembly, compiled or machine-level, to perform the processes. Those instructions can be written by one of ordinary skill in the art following the description of the figures corresponding to the processes and stored or transmitted on a computer readable medium. The instructions may also be created using source code or any other known computer-aided design tool. A computer readable medium may be any medium capable of carrying those instructions and include a CD-ROM, DVD, magnetic or other optical disc, tape, silicon memory (e.g., removable, non-removable, volatile or non-volatile), packetized or non-packetized data through wireline or wireless transmissions locally or remotely through a network. A computer is herein intended to include any device that has a general, multi-purpose or single purpose processor as described above. For example, a computer may be a personal computer ("PC"), laptop, smartphone, tablet device, set top box, or the like.

It is understood that the apparatuses, systems, computer program products, and processes described herein may also be applied in other types of apparatuses, systems, computer program products, and processes. Those skilled in the art will appreciate that the various adaptations and modifications of the aspects of the apparatuses, systems, computer program products, and processes described herein may be configured without departing from the scope and spirit of the present apparatuses, systems, computer program products, and processes. Therefore, it is to be understood that, within the scope of the appended claims, the present apparatuses, systems, computer program products, and processes may be practiced other than as specifically described herein.

We claim:

1. A computer program product comprising a non-transitory computer readable storage device having a computer readable program stored thereon, wherein the computer readable program when executed on a computer causes the computer to:

receive, from a client, a request to perform a task, the client having a predetermined limit of compute resources;

dispatch the task, from a batch scheduler to a compute node, as a non-speculative task if a quantity of compute resources is available at the compute node to process the task and the quantity of compute resources in addition to a total quantity of compute resources being utilized by the client is less than or equal to the predetermined limit such that the non-speculative task is processed without being preempted by an additional task requested by an additional client;

dispatch the task, from the batch scheduler to the compute node, as a speculative task if the quantity of compute resources is available to process the task and the quantity of compute resources in addition to the total quantity of compute resources is greater than the predetermined limit such that the speculative task is pre-emptible by the additional task requested by the additional client; and allow the client to opt-out of the dispatching of the task as a speculative task on a per task basis if the task is not restartable.

2. The computer program product of claim 1, wherein the computer is further caused to preempt the speculative task if the additional task requested by the additional client is non-speculative and an additional quantity of compute resources is unavailable to process the additional task.

3. The computer program product of claim 1, wherein the computer is further caused to promote the task from the speculative task to the non-speculative task based upon completion of an additional task requested by the client and the quantity of compute resources being utilized by the client being less than or equal to the predetermined limit.

4. The computer program product of claim 1, wherein the client is a computing device.

5. The computer program product of claim 1, wherein the compute node is a computing device.

6. The computer program product of claim 1, wherein the computer is further caused to select the compute node from a plurality of compute nodes based upon compute resource availability.

7. The computer program product of claim 1, wherein the batch scheduler communicates with the compute node to determine compute resource availability.

8. A method comprising:

receiving, from a client, a request to perform a task, the client having a predetermined limit of compute resources;

dispatching the task with a processor, from a batch scheduler to a compute node, as a non-speculative task if a quantity of compute resources is available at the compute node to process the task and the quantity of compute resources in addition to a total quantity of compute resources being utilized by the client is less than or equal to the predetermined limit such that the non-speculative task is processed without being preempted by an additional task requested by an additional client;

dispatching the task with the processor, from the batch scheduler to the compute node, as a speculative task if the quantity of compute resources is available to process the task and the quantity of compute resources in addition to the total quantity of compute resources is greater than the predetermined limit such that the speculative task is pre-emptible by the additional task requested by the additional client; and allowing the client to opt-out of the dispatching of the task as a speculative task on a per task basis if the task is not restartable.

9. The method of claim 8, further comprising preempting the speculative task if the additional task requested by the additional client is non-speculative and an additional quantity of compute resources is unavailable to process the additional task.

10. The method of claim 8, further comprising promoting the task from the speculative task to the non-speculative task based upon completion of an additional task requested by the client and the quantity of compute resources being utilized by the client being less than or equal to the predetermined limit.

11. The method of claim 8, wherein the client is a computing device.

12. The method of claim 8, wherein the compute node is a computing device.

13. The method of claim 8, further comprising selecting the compute node from a plurality of compute nodes based upon compute resource availability.

14. The method of claim 8, wherein the batch scheduler communicates with the compute node to determine compute resource availability.

15. A system comprising:

a processor having a batch scheduler that receives a request to perform a task from a client having a predetermined limit of compute resources, dispatches the task to a compute node as a non-speculative task if a quantity of compute resources is available at the compute node to process the task and the quantity of compute resources in addition to a total quantity of compute resources being utilized by the client is less than or equal to the predetermined limit such that the non-speculative task is processed without being preempted by an additional task requested by an additional client, dispatches the task to the compute node as a speculative task if the quantity of compute resources is available to process the task and the quantity of compute resources in addition to the total quantity of compute resources is greater than the predetermined limit such that the speculative task is pre-emptible by the additional task requested by the additional client, and allows the client to opt-out of the dispatching of the task as a speculative task on a per task basis if the task is not restartable.

16. A computer program product comprising a non-transitory computer readable storage device having a computer readable program stored thereon, wherein the computer readable program when executed on a computer causes the computer to:

receive a task and a type of the task from a batch scheduler at a compute node, the task being requested by a client having a predetermined limit of compute resources;

execute the task, at the compute node, as a non-speculative task if the type is non-speculative, the task being non-speculative if a quantity of compute resources is available at the compute node to process the task and the quantity of compute resources in addition to a total quantity of compute resources being utilized by the client is less than or equal to the predetermined limit such that the non-speculative task is processed without being preempted by an additional task requested by an additional client;

execute the task, at the compute node, as a speculative task if the type is speculative, the task being speculative if the quantity of compute resources is available to process the task and the quantity of compute resources in addition to the total quantity of compute resources is greater than the predetermined limit such that the speculative task is pre-emptible by the additional task requested by the additional client; and allow the client to opt-out of the execution of the task as the speculative task on a per task basis if the task is not restartable.

17. The computer program product of claim 16, wherein the computer is further caused to halt the execution of the speculative task upon receipt of a preemption instruction from the batch scheduler, the preemption instruction based upon the additional task requested by the additional client being non-speculative and an additional quantity of compute resources being unavailable to process the additional task.

18. The computer program product of claim 16, wherein the computer is further caused to promote the task from the speculative task to the non-speculative task upon receipt of a promotion instruction from the batch scheduler, the promotion instruction based upon completion of an additional task requested by the client and the quantity of compute resources being utilized by the client being less than or equal to the predetermined limit.

19. The computer program product of claim 16, wherein the client is a computing device.

20. The computer program product of claim 16, wherein the compute node is a computing device.

21. The computer program product of claim 16, wherein the compute node communicates with the batch scheduler to determine compute resource availability.

22. A method comprising:
    receiving a task and a type of the task from a batch scheduler at a compute node, the task being requested by a client having a predetermined limit of compute resources;
    executing the task, at the compute node, as a non-speculative task if the type is non-speculative, the task being non-speculative if a quantity of compute resources is available at the compute node to process the task and the quantity of compute resources in addition to a total quantity of compute resources being utilized by the client is less than or equal to the predetermined limit such that the non-speculative task is processed without being preempted by an additional task requested by an additional client;
    executing the task, at the compute node, as a speculative task if the type is speculative, the task being speculative if the quantity of compute resources is available to process the task and the quantity of compute resources in addition to the total quantity of compute resources is greater than the predetermined limit such that the speculative task is pre-emptible by the additional task requested by the additional client; and
    allowing the client to opt-out of the execution of the task as the speculative task on a per task basis if the task is not restartable.

23. The method of claim 22, further comprising halting the execution of the speculative task upon receipt of a preemption instruction from the batch scheduler, the preemption instruction based upon the additional task requested by the additional client being non-speculative and an additional quantity of compute resources being unavailable to process the additional task.

24. The method of claim 22, further comprising promoting the task from the speculative task to the non-speculative task upon receipt of a promotion instruction from the batch scheduler, the promotion instruction based upon completion of an additional task requested by the client and the quantity of compute resources being utilized by the client being less than or equal to the predetermined limit.

25. The method of claim 22, wherein the client is a computing device.

26. The method of claim 22, wherein the compute node is a computing device.

27. The computer program product of claim 22, wherein the compute node communicates with the batch scheduler to determine compute resource availability.

28. A system comprising:
    a processor that receives a task and a type of the task from a batch scheduler at a compute node, executes the task, at the compute node, as a non-speculative task if the type is non-speculative, executes the task, at the compute node, as a speculative task if the type is speculative, and allows a client to opt-out of the execution of the task as the speculative task on a per task basis if the task is not restartable, the task being speculative if the quantity of compute resources is available to process the task and the quantity of compute resources in addition to the total quantity of compute resources is greater than the predetermined limit such that the speculative task is pre-emptible by the additional task requested by the additional client, the task being requested by the client having a predetermined limit of compute resources, the task being non-speculative if a quantity of compute resources is available at the compute node to process the task and the quantity of compute resources in addition to a total quantity of compute resources being utilized by the client is less than or equal to the predetermined limit such that the non-speculative task is processed without being preempted by an additional task requested by an additional client.

* * * * *